United States Patent
Dursun et al.

(10) Patent No.: US 10,657,441 B2
(45) Date of Patent: May 19, 2020

(54) MODEL GENERATION FOR REAL-TIME RATE OF PENETRATION PREDICTION

(71) Applicant: Landmark Graphics Corporation, Houston, TX (US)

(72) Inventors: Serkan Dursun, Missouri City, TX (US); Nhon Ai T. Tran, Baton Rouge, LA (US); Giulia Toti, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 368 days.

(21) Appl. No.: 15/551,204

(22) PCT Filed: Apr. 1, 2015

(86) PCT No.: PCT/US2015/023802
§ 371 (c)(1),
(2) Date: Aug. 15, 2017

(87) PCT Pub. No.: WO2016/160005
PCT Pub. Date: Oct. 6, 2016

(65) Prior Publication Data
US 2018/0025269 A1    Jan. 25, 2018

(51) Int. Cl.
*G06N 3/08*    (2006.01)
*E21B 44/00*    (2006.01)
(Continued)

(52) U.S. Cl.
CPC ........... *G06N 3/08* (2013.01); *E21B 41/0092* (2013.01); *E21B 44/00* (2013.01); *E21B 44/04* (2013.01);
(Continued)

(58) Field of Classification Search
None
See application file for complete search history.

(56) References Cited

U.S. PATENT DOCUMENTS

| | | | |
|---|---|---|---|
| 6,293,356 B1 | 9/2001 | King et al. | |
| 2005/0209836 A1* | 9/2005 | Klumpen | G05B 19/41885 703/10 |

(Continued)

FOREIGN PATENT DOCUMENTS

| | | |
|---|---|---|
| GB | 2419983 A | 10/2006 |
| WO | 2013066746 A1 | 5/2013 |

(Continued)

OTHER PUBLICATIONS

Ma, Hai, "Formation Drillability Prediction Based on Multi-Source Information Fusion", Jun. 15, 2011, Journal of Petroleum Science and Engineering 78, Elsevier, B.V. (Year: 2011).*

(Continued)

*Primary Examiner* — Cedric Johnson
(74) *Attorney, Agent, or Firm* — Tenley Krueger; Baker Botts L.L.P.

(57) ABSTRACT

An example method includes receiving raw data sets containing drilling parameter and operating condition values generated during subterranean drilling operations. The raw data sets may be separated into training data sets based, at least in part, on the types of the subterranean drilling operations. At least one predictive model may be generated based, at least in part, on at least one training data set. The at least one predictive model may determine a rate of penetration (ROP) for a drilling operation of the same type to which the at least one training data set corresponds.

26 Claims, 5 Drawing Sheets

(51) Int. Cl.
  G06F 9/455    (2018.01)
  G06N 3/04     (2006.01)
  E21B 41/00    (2006.01)
  E21B 44/04    (2006.01)
  E21B 47/00    (2012.01)

(52) U.S. Cl.
  CPC .............. *E21B 47/00* (2013.01); *G06F 9/455* (2013.01); *G06N 3/0427* (2013.01); *G06N 3/0454* (2013.01)

(56) References Cited

U.S. PATENT DOCUMENTS

| | | | |
|---|---|---|---|
| 2005/0209912 A1* | 9/2005 | Veeningen | G06Q 10/06 705/7.12 |
| 2007/0185696 A1 | 8/2007 | Moran et al. | |
| 2012/0158761 A1 | 6/2012 | Aamodt et al. | |
| 2014/0067353 A1* | 3/2014 | Shelley | G06N 3/0427 703/10 |
| 2014/0116776 A1 | 5/2014 | Marx et al. | |
| 2015/0081222 A1* | 3/2015 | Laing | E21B 49/003 702/9 |

FOREIGN PATENT DOCUMENTS

| | | |
|---|---|---|
| WO | 2013188241 A2 | 12/2013 |
| WO | WO-2013188241 A2 * | 12/2013 |
| WO | 2014/011171 A1 | 1/2014 |
| WO | 2016160005 A1 | 10/2016 |

OTHER PUBLICATIONS

Bilgesu H.I. et al. "A New Approach for the Prediction of Rate of Penetration (ROP) Values", Oct. 22-24, 1997, SPE Eastern Regional Meeting, Society of Petroleum Engineers, Inc. (Year: 1997).*

Jahanbakhshi R. et al., "Real-Time Prediction of Rate of Penetration during Drilling Operation in Oil and Gas Wells", Jun. 24-27, 2012, 46th US Rock Mechanics/Geomechanics Symposium, American Rock Mechanics Association. (Year: 2012).*

Monazami, Mehran et al., "Drilling Rate of Penetration Prediction Using Artificial Neural Network: A Case Study of One of Iranian Southern Oil Fields", 2012, Oil and Gas Business, No. 6, Electronic Scientific Journal. (Year: 2012).*

Office Action issued in related Canadian patent application 2,977,943 dated Mar. 19, 2019, 6 pages.

Search report and written opinion issued in related French patent application 1650056 dated Aug. 19, 2018, 4 pages.

International Search Report on Patentability issued in relation to PCT Application No. PCT/US2015/023802 dated Oct. 12, 2017, 14 pages.

International Search Report and Written Opinion issued in related PCT Application No. PCT/US2015/023802 dated Dec. 1, 2015, 18 pages.

* cited by examiner

|  | 250 | | | | 260 | |
|---|---|---|---|---|---|---|
| 203 | 201 | 202 | 204 | | 205 | 206 |
| HOLE DEPTH | WOB | RPM | ROP | | Bit-Type | Drill-Type |
| 12836 | 27 | 115 | 62 | | Roller Cone | Sliding |
| 12836 | 27 | 116 | 68 | | | |
| 12836 | 27 | 110 | 56 | | | |
| 12836 | 27 | 116 | 63 | | | |
| 12837 | 27 | 117 | 51 | | | |
| 12837 | 27 | 118 | 79 | | | |
| 12837 | 27 | 115 | 36 | | | |
| 12837 | 27 | 115 | 58 | | | |
| 12837 | 27 | 115 | 55 | | | |
| 12837 | 28 | 116 | 74 | | | |
| 12838 | 29 | 1178 | 113 | | | |
| 12838 | 29 | 113 | 108 | | | |
| 12838 | 29 | 115 | 93 | | | |
| 12838 | 29 | 107 | 112 | | | |
| 12838 | 29 | 115 | 55 | | | |
| 12838 | 29 | 116 | 41 | | | |
| 12839 | 30 | 115 | 52 | | | |
| 12839 | 31 | 116 | 86 | | | |
| 12839 | 30 | 115 | 55 | | | |
| 12839 | 30 | 110 | 44 | | | |
| 12839 | 31 | 110 | 95 | | | |
| 12839 | 32 | 118 | 70 | | | |
| 12840 | 32 | 115 | 55 | | | |
| 12840 | 32 | 111 | 73 | | | |
| 12840 | 32 | 115 | 84 | | | |
| 12840 | 32 | 114 | 124 | | | |
| 12840 | 32 | 113 | 124 | | | |
| 12841 | 32 | 116 | 104 | | | |
| 12841 | 32 | 119 | 66 | | | |
| 12841 | 32 | 111 | 74 | | | |
| 12841 | 32 | 109 | 40 | | | |
| 12841 | 32 | 118 | 89 | | | |
| 12841 | 32 | 111 | 90 | | | |
| 12841 | 32 | 117 | 81 | | | |
| 12842 | 32 | 115 | 89 | | | |
| 12842 | 32 | 113 | 82 | | | |
| 12842 | 32 | 115 | 35 | | | |

Fig. 2

MODEL GENERATION FOR REAL-TIME RATE OF PENETRATION PREDICTION

CROSS-REFERENCE TO RELATED APPLICATION

The present application is a U.S. National Stage Application of International Application No. PCT/US2015/023802 filed Apr. 1, 2015, which is incorporated herein by reference in its entirety for all purposes.

BACKGROUND

The present disclosure relates generally to well drilling operations and, more particularly, to the generation and use of models for the prediction of operational parameters and performance results.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site with a drilling assembly, treating the wellbore to optimize production of hydrocarbons, and performing the necessary steps to produce and process the hydrocarbons from the subterranean formation. During drilling operations, the rate of penetration (ROP) of the drilling assembly into the formation may be an important factor in the overall performance of the drilling operation. Specifically, increasing the ROP reduces the time it takes to drill the wellbore and the expense of the drilling operation. An operator at the surface may control aspects of the drilling operation by setting drilling parameters for elements of the drilling assembly. The drilling parameters may affect the performance of the drilling operation, including, but not limited to, the ROP of the drilling assembly into the formation. However, determining the drilling parameters to produce an optimum ROP can be difficult due to the number of operational and physical variables on which it depends.

FIGURES

Some specific exemplary embodiments of the disclosure may be understood by referring, in part, to the following description and the accompanying drawings.

FIG. 2 is a diagram illustrating an example raw dataset of drilling parameter values and operating conditions collected during a drilling operation, according to aspects of the present disclosure.

Figure 1:
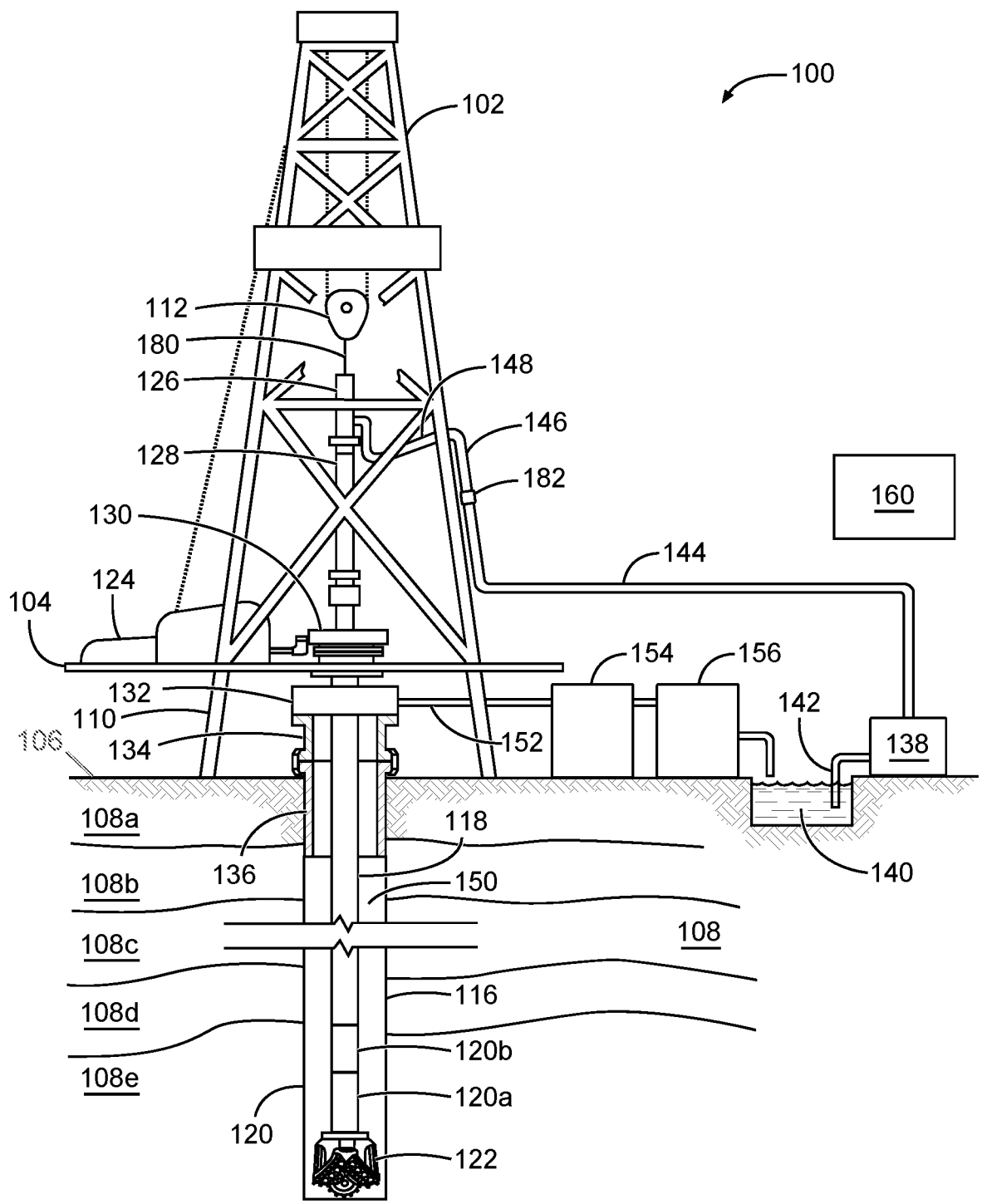
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram illustrating an example drilling system 100, according to aspects of the present disclosure. In the embodiment shown, the system 100 comprises a derrick 102 mounted on a floor 104 that is in contact with the surface 106 of a formation 108 through supports 110. The formation 108 may be comprised of a plurality of rock strata 108a-e, each of which may be made of different rock types with different lithology. At least some of the strata 108a-e may be porous and contain trapped liquids and gasses. Although the system 100 comprises an "on-shore" drilling system in which floor 104 is at or near the surface, similar "off-shore" drilling systems are also possible and may be characterized by the floor 104 being separated by the surface 106 by a volume of water.

The drilling system 100 may comprise a drilling assembly that includes a drill string 118, a bottom hole assembly (BHA) 120, a drill bit 122. The drill bit 122 may comprise different sizes and types of drill bits. Example drill bit types include, but are not limited to, a roller cone drill bit and a polycrystalline diamond compact (PDC) drill bit. The drill string 118 may comprise multiple drill pipe segments that are threadedly engaged and may extend downwardly through a bell nipple 132, blow-out preventer (BOP) 134, and wellhead 136 into a borehole 116 within the formation 108. The wellhead 132 may include a portion that extends into the borehole 116. In certain embodiments, the wellhead 136 may be secured within the borehole 116 using cement.

The BOP 134 may be coupled to the wellhead 136 and the bell nipple 132, and may work with the bell nipple 132 to prevent excess pressures from the formation 108 and borehole 116 from being released at the surface 106. For example, the BOP 134 may comprise a ram-type BOP that closes the annulus between the drill string 118 and the borehole 116 in case of a blowout. The BHA 120 may be coupled to the drill string 118, and the drill bit 122 may be coupled to the BHA 120. The BHA 120 may include tools such as LWD/MWD elements 120a and telemetry system 120b. The LWD/MWD elements 120a may comprise downhole instruments, including sensors, that continuously or intermittently monitor downhole conditions, drilling parameters, and other formation data. Information generated by the LWD/MWD element 120a may be stored while the instruments are downhole and recovered at the surface later, or communicated to the surface using telemetry system 120b.

The derrick 102 may comprise a traveling block 112 for raising or lowering the drilling assembly within the borehole 116. The drilling assembly may be suspended from the traveling block 112 by a hook assembly 180 coupled to the traveling block 112. In the embodiment shown, the drilling assembly is suspended from the hook assembly 180 via a swivel 126 that is coupled to the drill string 118 through a kelly 128, which supports the drill string 118 as it is lowered through a top drive or rotary table 130. A motor 124 may control the relative position of the traveling block 122 and therefore the position of the drilling assembly within the borehole 116. Once the drill bit 122 contacts the bottom of the borehole 116, the motor 124 and traveling block 122 may be used to control the downward force applied to the drill bit 122 from the drilling assembly. Specifically, lowering the traveling block 122 will increase the downward force applied to the drill bit 122 by increasing the amount of drilling assembly weight born by the formation 108 through the drill bit 122 rather than by the hook assembly 180. Conversely, raising the traveling block 122 will decrease the downward force applied to the drill bit 122 by increasing the amount of drilling assembly weight born by the hook assembly 180 rather than the formation 108 through the drill bit 122. The downward force on the drill bit 122 may comprise a drilling parameter of the drilling system 100 referred to as the "weight-on-bit." The amount of drilling assembly weight born by the hook assembly 180 may be referred to as the "hook load."

During drilling operations, drilling fluid, such as drilling mud, may be pumped by a mud pump 138 from a reservoir 140 through a suction line 142. The drilling mud may flow from the mud pump 138 into the drill string 118 at the swivel 126 through one or more fluid conduits, including pipe 144, stand-pipe 146, and hose 148. The drilling mud then may flow downhole through the drill string 118, exiting at the drill bit 122 and returning up through an annulus 150 between the drill string 118 and the borehole 116 in an open-hole embodiments, or between the drill string 118 and a casing (not shown) in a cased borehole embodiment. The rate at which the drilling mud flows downhole may be controlled by the pump 138 and may comprise a drilling parameter of the drilling system 100 referred to as the "downhole flow rate."

While in the borehole 116, the drilling mud may capture fluids and gasses from the formation 108 as well as particulates or cuttings that are generated by the drill bit 122 engaging with the formation 108. The bell nipple 132 may be in fluid communication with the annulus 150, and drilling mud may flow through the annulus 150 to the bell nipple 132 where it exits though a return line 152. The return line 152 may be coupled to one or more fluid treatment mechanisms 154/156, and provide fluid communication between the annulus 150 and the fluid treatment mechanisms 154/156. The rate at which the drilling mud flows through the return line 152 may be referred to as the "return flow rate." The fluid treatment mechanisms 154/156 may separate the particulates from the returning drilling mud before returning the drilling mud to the reservoir 140, where it can be recirculated through the drilling system 100.

The drill bit 122 may be driven by rotation of the drill string 114 by the top drive 130. The top drive 130 may be coupled to the drill string 118 and driven by the motor 124 or a separate motor. The motor 124 or another motor of the system 100 may cause the top drive 130 to rotate and impart torque to the drill string 118, therefore causing the drill string 118 and drill bit 122 to rotate. This may be referred to as a "rotary" mode of operation, which the rotational speed of the top drive 130 being referred to as the "rotary speed" in revolutions per minute (RPM) of the drilling assembly, and the torque applied to the drill string 118 by the top drive 130 being referred to as the "surface torque." The "surface torque" may be imparted to the drill bit 122 through the drill string 118, with a separate "torque on bit" value characterizing the torque felt by the drill bit 122. Generally, the "torque on bit" may be a function of the "surface torque" and the interaction of the drill bit 122 with the formation. In alternative embodiments, a downhole motor, such as a fluid-driven turbine, may be deployed in the BHA 120 and may solely rotate the drill bit 122, or rotate the drill bit 122 in addition to rotation applied to the drill bit 122 through the top drive 130 and drill string 118. This may be referred to as a "sliding" mode of operation. In those instances, the rotational speed of the drill bit 122 may be based, at least in part, on a flow rate of drilling fluid through the drill string 118, with the "torque on bit" being a function of the torque applied by the downhole motor, rather than the surface torque. The rotational speed of the drill bit 122 in both instances may be referred to as the "drill bit RPM." Other drilling assembly arrangements are possible, as would be appreciated by one of ordinary skill in the art in view of this disclosure.

In certain embodiments, the system 100 may also comprise or more sensors that monitor the operating conditions of the system 100 in real-time or near real-time. The sensors may be located within the drilling assembly, such as within the LWD/MWD elements 120a of the BHA 120, and at other locations at the surface 106, such as the pressure sensors 182 coupled to the stand pipe 146 to measure a stand pipe pressure (SPP) of the assembly 100. Operating conditions include, but are not limited to, the torque at the drill bit 122, the rate of penetration (ROP) of the drilling assembly, and the pressures within the fluid circulation system. The output of the sensors may be collected at the surface and stored, for example, in a database or data warehouse to be retrieved later.

In certain embodiments, the drilling system 100 may comprise a control unit 160 positioned at the surface 106. The control unit 160 may comprise an information handling system that may be communicably coupled to one or more controllable elements of the drilling system 100, including the pump 138 and motor 124. Controllable elements may comprise drilling equipment whose operating states can be altered or modified through an electronic control signals. An operator may interact with the controllable elements through the control unit 160 to alter the drilling parameters of the system 100. For example, an operator may set the drill bit RPM at a particular value, which may, in turn, cause the control unit 160 to issue a control signal to the motor 124 to alter the RPM of the top drive 130 and/or issue a control signal to the pump 138 to alter the flow rate of the drilling fluid. Similarly, the operator may set the WOB to a particular value, which may, in turn, cause the control unit 160 to issue a control signal to the motor 124 to move the traveling block 112.

The drilling parameters of the system 100 set by the operator may affect the operating conditions of the system 100. For example, the ROP of the drilling assembly, the torque at the drill bit, and the SPP may depend, in part, on the WOB, flow rate, and drill bit RPM. Generally, the operator may attempt to maintain the operating conditions in optimal ranges by searching for and identifying optimal combinations of drilling parameters. With respect to ROP, for example, the operator may attempt to alter the set points of the drilling parameters to maximize the ROP and therefore reduce the overall time it takes to drill the well. Determining the drilling parameters to maximize the ROP, however, may be difficult given its dependence on the number of drilling parameters and the physical characteristics of the drill assembly, wellbore, and formation.

FIG. 2 is a diagram illustrating an example raw dataset generated during a drilling operation. In the embodiment shown, the dataset comprises dynamic data 250 and static data 260. The dynamic data 250 may comprise drilling parameters, operating conditions, or any other numerical values tracked and stored during a drilling operation, including, but not limited to, WOB, rotary speed, drill bit RPM, hook load, surface torque and torque on bit, downhole mud flow rate, return mud flow rate, SPP, and ROP. In the embodiment shown, the dynamic data comprises WOB values 201 and drill bit RPM value 202 set by an operator while the drill bit is a particular depth 203 in the formation, and the ROP values 204 resulting from the corresponding WOB and drill bit RPM values 201/202. Each row in the dataset may comprise a unique data entry in which all of the dynamic values correspond. The static data 260, in contrast, may comprise numerical or nominal variables selected during well planning operations that cannot be quickly or easily changed during a drilling operation, such as the formation lithology, the drill bit type, the drill bit size, the type of drilling assembly (e.g., sliding or rotary), and the inclination of the well with respect to the surface. Here, the static data 260 includes the bit-type 205 and drilling type 206 of the drilling operation that produced the dynamic data 250.

According to aspects of the present disclosure, a predictive model may be generated using raw data sets similar to the one shown above. That model may be specific to the type of drilling operation that generated the raw data sets, and may be used to predict the ROP of a similarly configured drilling assembly based on certain drilling parameter and operating condition values of that drilling assembly. In certain embodiments, the static data described above may at least partially define the type of the corresponding drilling operation for purposes of predictive model generation. The raw data sets may be stored or real-time information from one or more well sites. For instance, a raw dataset may be a collection of sensor data and drilling parameter values stored in real-time or near real-time at an information handling system located at the drilling site, or a collection of sensor data and drilling parameter values transmitted to a data center, sever, or other storage device located remotely from the drilling site. In certain embodiments, the raw data sets from multiple drilling operations may be aggregated into a central data repository containing the raw data sets for a group of well drilled into a particular formation, or into multiple formations at remote geographic locations. These datasets may be retrieved and segregated according to the types of drilling operations and formations from which they were produced, and used to generated context-specific predictive models that can be used to predict the ROP of future drilling operations of similar types and in similar formations.

Figure 3:
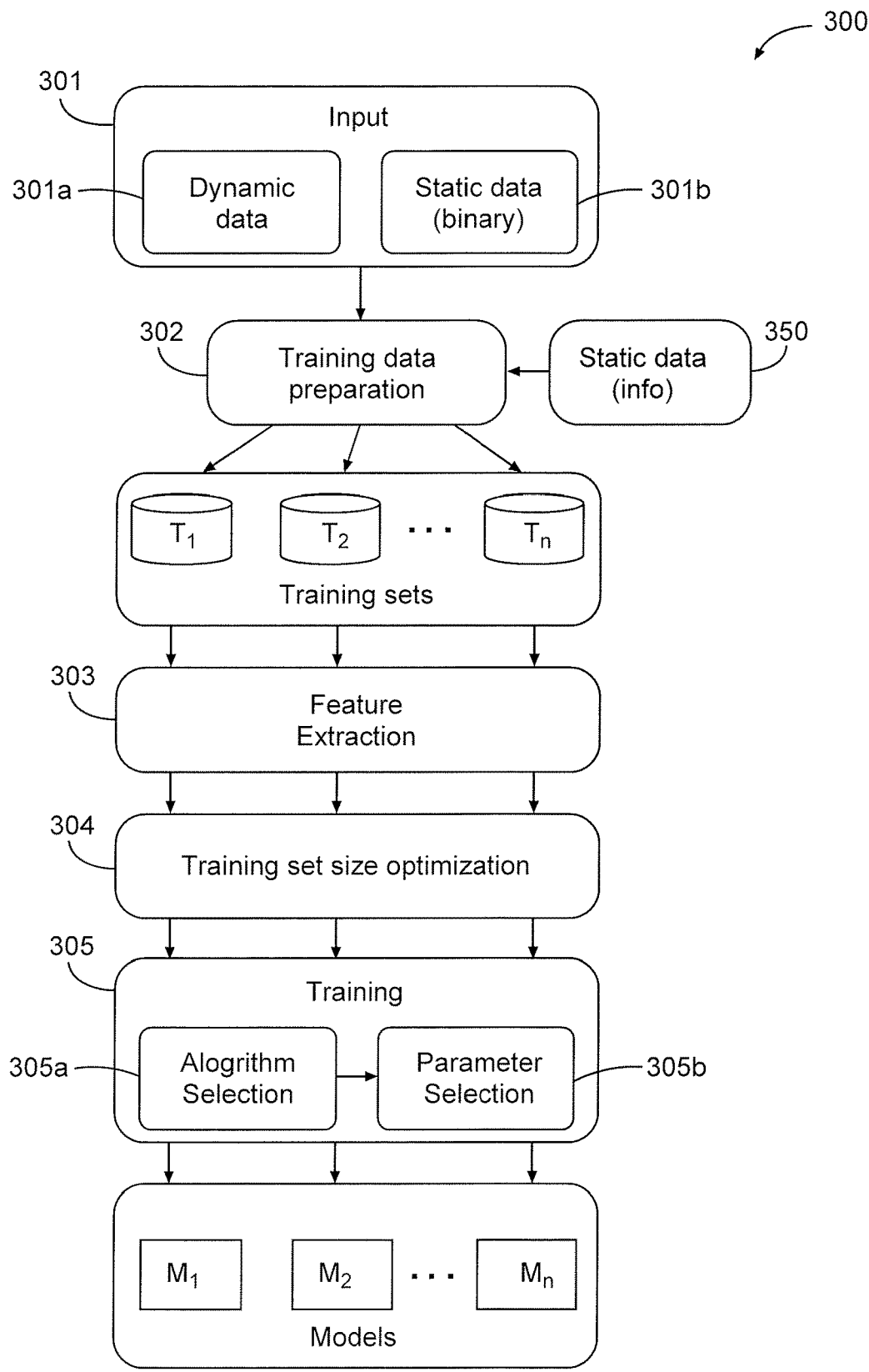
FIG. 3 is a diagram illustrating an example process flow for generating at least one context-specific predictive model, according to aspects of the present disclosure.

FIG. 3 is a diagram illustrating an example process flow 300 for generating at least one predictive model, according to aspects of the present disclosure. In certain embodiments, some of all of the steps below may be implemented in one or more information handling systems executing computer readable instructions in the form of software. For example, an information handling system may include software executable by a processor of the information handling system to perform each of the steps below, including accessing or otherwise receiving raw data from a remote data storage facility through a data network, manipulating the raw data, generating one or more predictive models, and storing the generated predictive models to the same or a different remote data storage facility through the data network.

Step 301 comprises receiving data generated during at least one drilling operation performed at one or more well sites. In the embodiment shown, the data comprises dynamic data 301a and static data 301b, and may be similar to the dataset described above with reference to FIG. 2. In the embodiment shown, any nominal variables within the static data 301b may be binarized into a numerical form and incorporated with the numerical values of the dynamic data 301a. In other embodiments, some or all of the static data 301b may be left in a nominal form, separate from the dynamic data 301a received at step 301, and used later in the process to segregate the dynamic data 301a for the purpose of generating context-specific predictive models associated with some or all of the static data.

Step 302 may comprise pre-processing steps to eliminate noisy, corrupted, or missing data from the received data 301. For example, the pre-processing steps may include the application of one or more thresholds, data filters and noise reduction algorithms, to alter or remove specific data entries or entire data sets. In certain embodiments, the pre-processing step 302 may also include data segregation functionality in which the received data 301 is separated into one or more training data sets $T_1$-$T_n$ that each include some or all of the pre-processed received data 301. Each of the training data sets $T_1$-$T_n$ may be associated with one or more different static variables, identified either through the binarized variables in the received data 301, or through nominal values 350 received at the pre-processing step 302. For instance, one of the training data sets $T_1$-$T_n$ may comprise all of the pre-processed data entries from the received data 301 that were generated during a drilling operation using a roller cone drill bit; another may comprise all of the pre-processed data entries generated during a drilling operation using a PDC drill bit; and yet another may comprise all of the pre-processed data entries generated during a drilling operation using a PDC drill bit and a sliding-type drilling assembly in a shale formation. As will be described below, each of these segregated training data sets $T_1$-$T_n$ may be used to generate a different context-specific predictive model associated with the same static variables as the training data set used to generate the model. These models can then be used to accurately predict ROP for future drilling operations utilizing the same static variables as the model.

Step 303 comprises a feature extraction step that may be used to reduce the dimensionality of the training data sets $T_1$-$T_n$ before they are used to generate predictive models. As will be described in detail below, the context-specific predictive models may identify a relationship between certain the drilling parameters and operating conditions of a drilling operation and the resulting ROP of the drilling assembly, such that when a combination of drilling parameters and operating conditions are used as an input to the model, the resulting ROP can be calculated. In certain instances, however, some of the drilling parameters and operating conditions may be redundant or otherwise have little, if any, effect on the resulting ROP, and including those drilling parameters and operating conditions may increase the computational load required to generate the predictive model, and actually reduce the accuracy of the model through overfitting. The feature extraction step may simplify the training data sets $T_1$-$T_n$ by excluding certain data entries and/or drilling parameters and operating conditions using at least one feature extraction technique, thereby simplifying and increasing the accuracy of the resulting predictive models.

In certain embodiments, the feature extraction techniques may comprise one or more linear and/or nonlinear dimensionality reduction techniques. Example linear dimensionality reduction techniques include, but are not limited to, principal component analysis, partial least squares regression, and independent component analysis. Example nonlinear dimensionality reduction techniques include, but are not limited to, isomaps and autoencoders. Generally, each of the reduction techniques may be implemented by a processor of an information handling system executing software in the form of computer readable instructions stored in a memory device coupled to the processor. The instructions may cause the processor to perform one or more steps of the algorithms associated with the linear and/or nonlinear dimensionality reduction techniques, examples of which are described below.

With respect to the example linear dimensionality reduction techniques, principal component analysis may comprise a statistical algorithm in which a set of observations of possibly correlated variables, e.g., the dynamic variables and the ROP for a drilling operation, are converted using an orthogonal transformation into a set of values of linearly uncorrelated variables referred to as principal components. These principal components for the variables in the training data sets $T_1$-$T_n$ may comprise hyperplanes of minimum variance between the ROP of a drilling operation and the independent variables in the training data sets $T_1$-$T_n$ that affect the ROP. The number of principal components for the variables in the training data sets 203 may be less that or equal to the number of variables within the variables in the training data sets $T_1$-$T_n$, with the higher order principal components having little appreciable variance with the ROP. By excluding some of these higher order principal components, the variables with high variance with the ROP may be determined and selected, and those with little variance may be excluded. Another example linear dimensionality reduction technique, partial least squares regression, is a statistical algorithm in which dependent variables (e.g., ROP) and independent variables (e.g., hook load, flow rate, etc.) of the training data sets $T_1$-$T_n$ are received by a processor are projected into a new space. The processor may then determine a linear regression model that identifies the covariance structures between the projections, which can then be used to identify the independent variables of the training data sets $T_1$-$T_n$ that most affect the resulting ROP. Other example linear dimensionality reduction techniques comprise independent component analysis, and any other linear dimensionality reduction techniques that would be appreciated by one of ordinary skill in the art in view of this disclosure.

One example nonlinear dimensionality reduction technique includes the use of an autoencoder, which may comprise a feed-forward neural network that is trained to perform a specific function. As used herein, a neural network may comprise one or more processors or information handling systems implementing a statistical learning algorithm that generally presents a system of interconnected "neurons" that are trained to produce a pre-defined output based on a set of pre-defined input values. Within the context of the present applications, the neural network may be trained to receive as inputs the independent and dependent variables from the training data sets $T_1$-$T_n$ and "encode" inputs into a set of data with a lower dimensionality. Through the encoding step, the neural network may select the variables that have the most significant effects on the resulting ROP, such that the variables not selected by the neural network may be excluded from the training data sets $T_1$-$T_n$. Other nonlinear dimensionality reduction techniques are possible, as would be appreciated by one of ordinary skill in the art in view of this disclosure.

Step 304 comprises a training set size optimization step that may be used to improve predictive performance of the resulting predictive models, described below. The size of the training set can impact the accuracy of the resulting predictive model. Generally, the training set needs to be big enough to capture the underlying behavior, but training sets that are too large can lead to overfitting. Optimizing the size of the training sets can, therefore, improve the accuracy of the resulting predictive model and reduce the computational time needed to generate the model.

In certain embodiments, the size optimization step may be performed by determining an optimum size threshold for a particular data set or a group of data sets, and limiting the number of data entries in the training data sets according to that threshold. In certain embodiments, a threshold may be determined by dividing a sample training data set into a training subset and a testing subset. A predictive model may then be trained using increasing numbers of data entries from the training subset, until the accuracy of the resulting predictive model plateaus, such that increasing the number of data entries used to train the predictive model does not improve the accuracy of the resulting model more than a threshold amount, e.g., 0.5%. Once established, this threshold may be applied globally to all training data sets, or to training data sets that share characteristics, e.g., static variables, with the training data set used to establish the threshold. In other embodiments, data analytics may be used to determine an optimum training data size. Once the threshold and/or optimum training data size are selected, each training data set may be reduced to a subset of randomly selected data entries from the corresponding training data set, with the number of data entries in each subset being based, at least in part, on the threshold and/or optimum training data size.

Step 305 comprises a training step, in which at least one learning algorithm 305a with associated parameters 305b may be trained with the training data sets $T_1$-$T_n$ to produce one or more context-specific predictive models $M_1$-$M_n$. For instance, a learning algorithm may receive as an input training data set $T_1$ and determine a relationship between the drilling parameters and operational conditions within training data set $T_1$ and the ROP values within training data set $T_1$ that result from the associated drilling parameters and operational conditions. The determined relationship may comprise a context-specific predictive models $M_1$ corresponding to the training data set $T_1$ that is trained to determine a resulting ROP value for drilling operations with the same static variable values or context as the training data set $T_1$, when it receives as an input drilling parameters and operational conditions of the same type as in training data set $T_1$, Context-specific predictive models $M_1$-$M_n$ respectively corresponding to each one of the training data sets $T_1$-$T_n$ may be generated in the same manner.

In certain embodiments, the learning algorithm 305a may comprise supervised and unsupervised learning algorithms and may include a decision tree, a Bayesian belief networks, a genetic algorithms, an artificial neural network, and/or a support vector machines. Each of the above learning algorithms may "learn" by generating and refining an internal model based on the training data set. This internal model may be the context-specific predictive model corresponding to the training data set.

In certain embodiments, the learning process of a particular learning algorithm may depend, at least in part, on one or more tunable parameters of the algorithm. The parameter selection process may comprise a separate step within the training step 305 to be completed before the predictive models $M_1$-$M_n$ are generated. The parameters may be tuned manually, by a user, or automatically selected to optimize the learning process. One example process for selecting optimized parameters comprises a grid search, whereby grid of parameters within specified ranges are identified, and each combination of parameters is tested within the learning algorithm and scored. Another example process comprises a randomized parameter optimization technique in which sample values from a distribution of possible parameter values are randomly selected and scored, with the optimized parameter values being extrapolated from the sample scores. Another example process comprises a linear search technique in which each parameter value in a set of parameter values is selected and tested individually. In certain embodiments, the range of parameter values may be pre-defined by a user, and a process of an information handling system may retrieve the pre-defined values according to a set of instructions computer readable instructions associated with the corresponding learning algorithm and parameter selection process. In certain embodiments, separate parameter selection processes may be performed for each of the training data sets $T_1$-$T_n$ to increase the accuracy of the corresponding predictive models $M_1$-$M_n$.

In certain embodiments, once the predictive models $M_1$-$M_n$ have been generated, they may be stored in a central data repository similar to the data repository in which the raw data sets are stored. These context-specific predictive models $M_1$-$M_n$ may be subsequently accessed and selected as needed to predict the ROP values for drilling operations. In certain embodiments, one or more of the context-specific predictive models $M_1$-$M_n$ may be selected based on the operation context of the subsequent drilling operation. For instance, if a planned drilling operation will use a roller cone drill bit and a sliding-type drilling assembly, the context-specific predictive models associated with the operational context may be selected and used with dynamic drilling parameters and operating conditions from that drilling operation to identify the resulting ROP. If the resulting ROP is not sufficient, the drilling parameters can be modified until an acceptable value is reached.

In certain embodiments, the stored context-specific predictive models $M_1$-$M_n$ may also be accessed and modified based on subsequently available raw data. Specifically, raw data generated after the context-specific predictive models $M_1$-$M_n$ were made may be used as new training data sets that may alter the established relationships within the predictive models. This may improve the accuracy of the models, for example, resulting in a more accurate ROP determination going forward.

Figure 4:
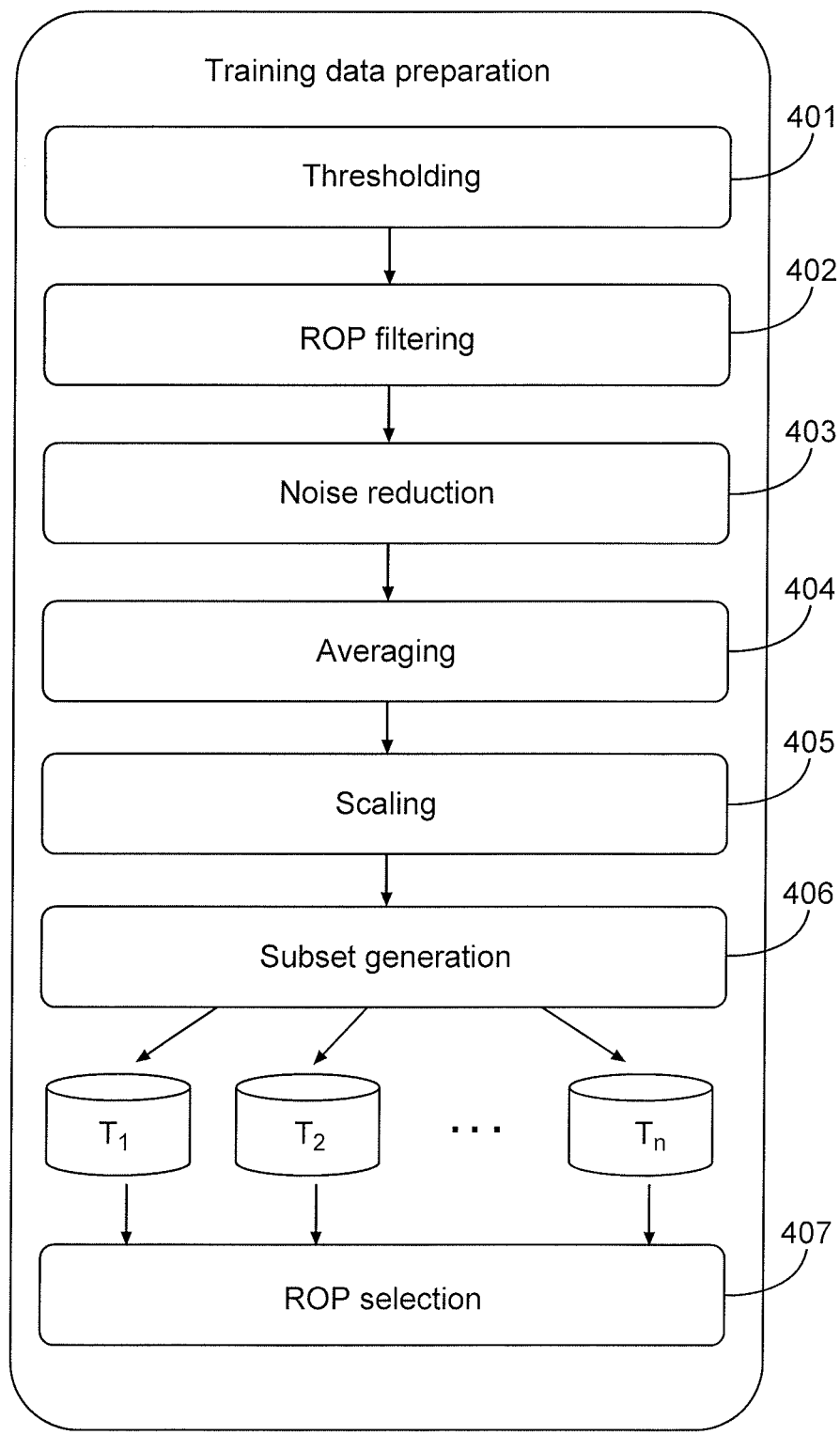
FIG. 4 is a diagram illustrating example process steps for a pre-processing operation, according to aspects of the present disclosure.

As described above with reference to FIG. 3, the process may include pre-processing steps to eliminate noisy, corrupted, or missing data from the received data. FIG. 4 is a diagram illustrating example process steps for a pre-processing operation, according to aspects of the present disclosure. Generally, the steps described below may be performed by a processor of an information handling system that retrieves the data from the drilling operations and modifies or removes data entries from the data sets based on a set of computer readable instructions associated with each of the steps.

Step 401 comprises a threshold step that targets numerical values in the data entries of the received data that fall outside of a user defined range. For example, if a numerical value for the WOB parameter in a particular data entry falls outside of a particular threshold (e.g., the WOB parameter has a negative value) the data entry may be removed from received data such that it is not propagated into a training data set. Some or all of the drilling parameters and operating conditions may have associated thresholds that are selected to remove from the received data any data entries with non-realistic values, or values that otherwise do not reflect proper operation of a drilling assembly. The thresholds may be applied, for example, by iteratively checking the value in each data entry corresponding to a particular threshold, repeating the process for each identified threshold, and removing from the received data any data entries with at least one value that falls outside of a threshold.

Step 402 comprises a filtering step in which data entries may be removed based on a qualitative assessment of the data entry. For example, certain raw data sets include ROP values that were measured during the drilling operation, but calculated after the fact, and data entries or entries raw data sets containing these ROP values may be removed from the received data. Other qualitative factors may also be accounted for, including the range of the measured bit depth to the measured hole depth when the data was collected.

Step 403 comprises a noise reduction step that may identify values in data entries that fall within the thresholds of step 401 but still contain corrupted values. In certain embodiment, this step may comprise plotting the corresponding values in consecutive data entries and determining one ore more trend lines within that plot. If a value deviates from the trend line by a certain percentage, or by an amount exceeding an error threshold, for example, that value may be identified as "noise" or an error and the data entry containing that value may be removed from the received data.

Step 404 comprises an averaging step that may be used instead of or addition to the noise reduction step 403. In certain embodiment, the averaging step may include determining the average value of a given drilling parameter or operating condition within a pre-determined number of consecutive data entries, or within a pre-determined range of depth or time. By averaging the values, noisy or erroneous entries may be identified or removed, or the average value may be substituted for the instantaneous values in the data entries.

Step 405 comprises a scaling step in which the values within the data entries may be scaled or otherwise normalized. For instance, the values in the data entries for the WOB parameter may be scaled or normalized to between 0 and 1, or −1 and 1. The scaling operation may comprise identifying the maximum and minimum values from the WOB parameter within the data entries, and then for each WOB parameter value within the data entries, subtracting the minimum value and dividing by the difference between the maximum and minimum values. Scaled or normalized values may increase the accuracy of the resulting predictive model in certain instances.

Step 406 comprises a subset generation step in which the received data may be divided into a plurality of training data sets $T_1$-$T_n$. As described above, the received data may be divided based on the context of the drilling operating during which the data was generated, as indicated by static variables corresponding to the data. For example, the received data may be divided or segregated based on the lithology of the formation drilling when the data was collected, the drill bit size or type used during the drilling operation, and/or the type of drilling assembly used. As is also described above, each of the training data sets $T_1$-$T_n$ may be used to train a different context-specific predictive model.

Step 407 comprises a data selection step, in which the data in the training data sets $T_1$-$T_n$ is limited to data entries corresponding to ideal or acceptable drilling operation performances. For instance, step 407 may include a selection process whereby only the data entries with optimal or near optimal ROP values are included in the training sets. This may improve the predictive model resulting from the training data set by forcing the learning algorithm to account for only acceptable results.

In certain embodiments, the selection process may comprise a quantile aggregation procedure in which the data entries are ordered by their corresponding ROP values, and divided into two or more groups. The groups may be determined, for example, such that each group has the same number of data entries, or based on the percentage deviation from maximum ROP within the group of data entries. Once the data entries are grouped, one or more of the groups may be selected and the corresponding data entries included in the training data set, and the data entries from the other group(s) excluded from the training data set.

Figure 5:
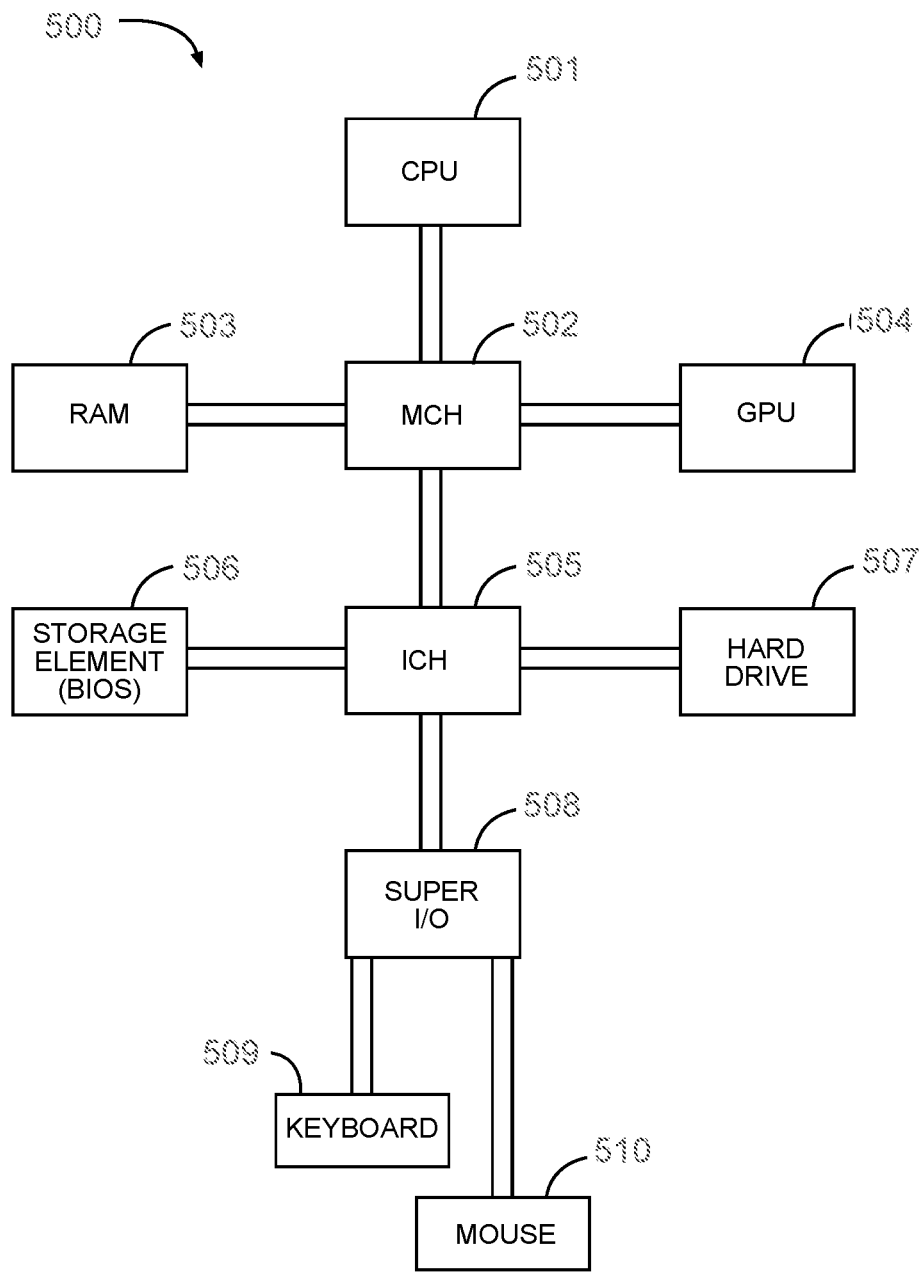
FIG. 5 is a diagram of an example information handling system, according to aspects of the present disclosure.

FIG. 5 is a block diagram showing an example information handling system 500, according to aspects of the present disclosure. Information handling system 500 may be used, for example, as part of a control system or unit for a drilling assembly and/or to generate the context-specific predictive models described above. The information handling system 500 may comprise a processor or CPU 501 that is communicatively coupled to a memory controller hub or north bridge 502. Memory controller hub 502 may include a memory controller for directing information to or from various system memory components within the information handling system, such as RAM 503, storage element 506, and hard drive 507. The memory controller hub 502 may be coupled to RAM 503 and a graphics processing unit 504. Memory controller hub 502 may also be coupled to an I/O controller hub or south bridge 505. I/O hub 505 is coupled to storage elements of the computer system, including a storage element 506, which may comprise a flash ROM that includes a basic input/output system (BIOS) of the computer system. I/O hub 505 is also coupled to the hard drive 507 of the computer system. I/O hub 505 may also be coupled to a Super I/O chip 508, which is itself coupled to several of the I/O ports of the computer system, including keyboard 509 and mouse 510. The information handling system 500 further may be communicably coupled to one or more elements of a drilling system though the chip 508.

According to aspects of the present disclosure, an example method includes receiving raw data sets containing drilling parameter and operating condition values generated during subterranean drilling operations. The raw data sets may be separated into training data sets based, at least in part, on the types of the subterranean drilling operations. At least one predictive model may be generated based, at least in part, on at least one training data set. The at least one predictive model may determine a rate of penetration (ROP) for a drilling operation of the same type to which the at least one training data set corresponds.

In certain embodiments, the method may further comprise the step of reducing the dimensionality of at least one of the training data sets using at least one feature extraction technique. In certain embodiment, the at least one feature extraction technique may comprise at least one of a principal component analysis, a partial least squares regression, an independent component analysis, an isomap, and an autoencoder. In certain embodiments, generating at least one predictive model based, at least in part, on at least one training data set may comprise training a learning algorithm using the at least one training data set. In certain embodiments, the learning algorithm may comprise at least one of a decision tree, a Bayesian belief network, a genetic algorithm, an artificial neural network, and a support vector machines. In certain embodiments, training a learning algorithm using the at least one training data set may comprise determining at least one parameter of the learning algorithm using at least one of a grid search, a randomized parameter optimization, and a linear search.

In certain embodiments, the method may further comprise reducing the number of data entries in at least one of the training data sets based, at least in part, on a pre-determined threshold. In certain embodiments, the method may further comprise at least one of thresholding, ROP filtering, averaging, and normalizing the raw data. In certain embodiments, the method may further comprise separating the raw data sets into dynamic and static data. In certain embodiments, the type to which the at least one training data set corresponds is based, at least in part, on the static data. In certain embodiments, the method may further comprise removing at least some data entries of the raw data sets based, at least in part, on ROP values within the data entries.

In any of the embodiments described in the preceding three paragraphs, the method may further comprise determining a ROP for a drilling operation using the model and altering at least one drilling parameter of the drilling operation based, at least in part, on the determined ROP. In any of the embodiments described in the preceding three paragraphs, receiving raw data sets containing drilling parameter and operating condition values generated during subterranean drilling operations may comprise receiving raw data sets containing numerical values corresponding to at least one of a weight on bit (WOB), rotary speed, drill bit rotations per minute (RPM), hook load, surface torque, torque on bit, downhole mud flow rate, return mud flow rate, stand pipe pressure (SPP), and ROP; and separating the raw data sets into training data sets based, at least in part, on the types of the subterranean drilling operations may comprise separating the raw data sets based, at least in part, on a formation lithology, a drill bit type, a drill bit size, a drilling assembly type, and a well inclination of the subterranean drilling operations.

According to aspects of the present disclosure, an example non-transitory computer readable medium may contain a set of instructions that, when executed by a processor of an information handling system, cause the processor to receive raw data sets containing drilling parameter and operating condition values generated during subterranean drilling operations, and separate the raw data sets into training data sets based, at least in part, on the types of the subterranean drilling operations. The set of instructions may further cause the processor to generate at least one predictive model based, at least in part, on at least one training data set, wherein the at least one predictive model determines a rate of penetration (ROP) for a drilling operation of the same type to which the at least one training data set corresponds.

In certain embodiments, the set of instructions may further cause the processor to reduce the dimensionality of at least one of the training data sets using at least one feature extraction technique. In certain embodiments, the at least one feature extraction technique may comprise at least one of a principal component analysis, a partial least squares regression, an independent component analysis, an isomap, and an autoencoder. In certain embodiments, the set of instructions that cause the processor to generate at least one predictive model based, at least in part, on at least one training data set may further cause the processor to train a learning algorithm using the at least one training data set. In certain embodiments, the learning algorithm comprises at least one of a decision tree, a Bayesian belief network, a genetic algorithm, an artificial neural network, and a support vector machines. In certain embodiments, the set of instructions that cause the processor to train a learning algorithm using the at least one training data set may further cause the processor to determine at least one parameter of the learning algorithm using at least one of a grid search, a randomized parameter optimization, and a linear search.

In certain embodiments, the set of instructions may further cause the processor to reduce the number of data entries in at least one of the training data sets based, at least in part, on a pre-determined threshold. In certain embodiments, the set of instructions may further cause the processor to threshold, ROP filter, average, and normalize the raw data. In certain embodiments, the set of instructions may further cause the processor to separate the raw data sets into dynamic and static data. In certain embodiments, the type to which the at least one training data set corresponds is based, at least in part, on the static data. In certain embodiments, the set of instructions may further cause the processor to remove at least some data entries of the raw data sets based, at least in part, on ROP values within the data entries.

In any of the embodiments of the preceding three paragraphs, the set of instructions may further cause the processor to determine a ROP for a drilling operation using the model and altering at least one drilling parameter of the drilling operation based, at least in part, on the determined ROP. In any of the embodiments of the preceding three paragraphs, the set of instructions that cause the processor to receive raw data sets containing drilling parameter and operating condition values generated during subterranean drilling operations may further cause the processor to receive raw data sets containing numerical values corresponding to at least one of a weight on bit (WOB), rotary speed, drill bit rotations per minute (RPM), hook load, surface torque, torque on bit, downhole mud flow rate, return mud flow rate, stand pipe pressure (SPP), and ROP; and the set of instructions that cause the processor to separate the raw data sets into training data sets based, at least in part, on the types of the subterranean drilling operations may further cause the processor to separate the raw data sets based, at least in part, on a formation lithology, a drill bit type, a drill bit size, a drilling assembly type, and a well inclination of the subterranean drilling operations.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
    receiving raw data sets comprising dynamic data and static data, wherein the dynamic data comprises drilling parameter and operating condition values generated during subterranean drilling operations, wherein the static data is indicative of one or more types of the subterranean drilling operations that generated the dynamic data;
    separating the raw data sets into training data sets based, at least in part, on the one or more types of the subterranean drilling operations identified in the static data of the raw data sets;
    generating at least one predictive model based, at least in part, on at least one training data set of the training data sets, wherein the at least one predictive model determines a rate of penetration (ROP) for the one or more types to which the at least one training data set corresponds, wherein generating the at least one predictive model comprises for each training data set of the training data sets generating a different context-specific predictive model associated with the static data used to generate the at least one predictive model.

2. The method of claim 1, further comprising the step of reducing dimensionality of at least one of the training data sets using at least one feature extraction technique before the at least one of the training data sets is used for the at least one predictive model.

3. The method of claim 2, wherein the at least one feature extraction technique comprises at least one of a principal component analysis, a partial least squares regression, an independent component analysis, an isomap, and an autoencoder.

4. The method of claim 1, wherein generating at least one predictive model based, at least in part, on at least one training data set comprises training a learning algorithm using the at least one training data set.

5. The method of claim 4, wherein the learning algorithm comprises at least one of a decision tree, a Bayesian belief network, a genetic algorithm, an artificial neural network, and a support vector machines.

6. The method of claim 5, wherein training a learning algorithm using the at least one training data set comprises determining at least one parameter of the learning algorithm using at least one of a grid search, a randomized parameter optimization, and a linear search.

7. The method of claim 1, further comprising reducing a number of data entries in at least one of the training data sets based, at least in part, on a pre-determined threshold.

8. The method of claim 1, further comprising at least one of thresholding, ROP filtering, averaging, and normalizing the raw data.

9. The method of claim 1, further comprising separating the raw data sets into the dynamic data and the static data.

10. The method of claim 9, wherein the one or more types to which the at least one training data set corresponds is based, at least in part, on the static data.

11. The method of claim 1, further comprising removing at least some data entries of the raw data sets based, at least in part, on ROP values within the data entries.

12. The method of claim 1, further comprising determining a ROP for a drilling operation using the model and altering at least one drilling parameter of the drilling operation based, at least in part, on the determined ROP.

13. The method of claim 1,
    wherein receiving raw data sets containing drilling parameter and operating condition values generated during subterranean drilling operations comprises receiving raw data sets containing numerical values corresponding to at least one of a weight on bit (WOB), rotary speed, drill bit rotations per minute (RPM), hook load, surface torque, torque on bit, downhole mud flow rate, return mud flow rate, stand pipe pressure (SPP), and ROP; and
    wherein separating the raw data sets into training data sets based, at least in part, on the one or more types of the subterranean drilling operations comprises separating the raw data sets based, at least in part, on a formation lithology, a drill bit type, a drill bit size, a drilling assembly type, and a well inclination of the subterranean drilling operations.

14. A non-transitory computer readable medium containing a set of instructions that, when executed by a processor of an information handling system, cause the processor to
    receive raw data sets comprising dynamic data and static data, wherein the dynamic data comprises drilling parameter and operating condition values generated during subterranean drilling operations, wherein the static data is indicative of one or more types of the subterranean drilling operations that generated the dynamic data;
    separate the raw data sets into training data sets based, at least in part, on the one or more types of the subterranean drilling operations identified in the static data of the raw data sets;
    generate at least one predictive model based, at least in part, on at least one training data set of the training data sets, wherein the at least one predictive model determines a rate of penetration (ROP) for the one or more types to which the at least one training data set corresponds, wherein generating the at least one predictive model comprises for each training data set of the training data sets generating a different context-specific predictive model associated with the static data used to generate the at least one predictive model.

15. The non-transitory computer readable medium of claim 14, wherein the set of instructions further cause the processor to reduce dimensionality of at least one of the training data sets using at least one feature extraction technique before the at least one of the training data sets is used for the at least one predictive model.

16. The non-transitory computer readable medium of claim 15, wherein the at least one feature extraction technique comprises at least one of a principal component analysis, a partial least squares regression, an independent component analysis, an isomap, and an autoencoder.

17. The non-transitory computer readable medium of claim 14, wherein the set of instructions that cause the processor to generate at least one predictive model based, at least in part, on at least one training data set further cause the processor to train a learning algorithm using the at least one training data set.

18. The non-transitory computer readable medium of claim 17, wherein the learning algorithm comprises at least one of a decision tree, a Bayesian belief network, a genetic algorithm, an artificial neural network, and a support vector machines.

19. The non-transitory computer readable medium of claim 18, wherein the set of instructions that cause the processor to train a learning algorithm using the at least one training data set further cause the processor to determine at least one parameter of the learning algorithm using at least one of a grid search, a randomized parameter optimization, and a linear search.

20. The non-transitory computer readable medium of claim 14, wherein the set of instructions further cause the processor to reduce a number of data entries in at least one of the training data sets based, at least in part, on a pre-determined threshold.

21. The non-transitory computer readable medium of claim 14, wherein the set of instructions further cause the processor to threshold, ROP filter, average, and normalize the raw data.

22. The non-transitory computer readable medium of claim 14, wherein the set of instructions further cause the processor to separate the raw data sets into the dynamic data and the static data.

23. The non-transitory computer readable medium of claim 22, wherein the one or more types to which the at least one training data set corresponds is based, at least in part, on the static data.

24. The non-transitory computer readable medium of claim 14, wherein the set of instructions further cause the processor to remove at least some data entries of the raw data sets based, at least in part, on ROP values within the data entries.

25. The non-transitory computer readable medium of claim 14, wherein the set of instructions further cause the processor to determine a ROP for a drilling operation using the model and altering at least one drilling parameter of the drilling operation based, at least in part, on the determined ROP.

26. The non-transitory computer readable medium of claim 14,
wherein the set of instructions that cause the processor to receive raw data sets containing drilling parameter and operating condition values generated during subterranean drilling operations further cause the processor to receive raw data sets containing numerical values corresponding to at least one of a weight on bit (WOB), rotary speed, drill bit rotations per minute (RPM), hook load, surface torque, torque on bit, downhole mud flow rate, return mud flow rate, stand pipe pressure (SPP), and ROP; and
wherein the set of instructions that cause the processor to separate the raw data sets into training data sets based, at least in part, on the one or more types of the subterranean drilling operations further cause the processor to separate the raw data sets based, at least in part, on a formation lithology, a drill bit type, a drill bit size, a drilling assembly type, and a well inclination of the subterranean drilling operations.

\* \* \* \* \*